US008566417B2

(12) United States Patent
Belimpasakis et al.

(10) Patent No.: US 8,566,417 B2
(45) Date of Patent: Oct. 22, 2013

(54) NETWORK ACCESS WITH A PORTABLE MEMORY DEVICE

(75) Inventors: Petros Belimpasakis, Tempere (FI); Marko Luomi, Lempäälä (FI); Teemu Savolainen, Nokia (FI)

(73) Assignee: Nokia Corporation, Espoo (FI)

( * ) Notice: Subject to any disclaimer, the term of this patent is extended or adjusted under 35 U.S.C. 154(b) by 1010 days.

(21) Appl. No.: 11/798,943

(22) Filed: May 17, 2007

(65) Prior Publication Data

US 2008/0005260 A1    Jan. 3, 2008

(30) Foreign Application Priority Data

Jun. 30, 2006  (FI) .................................... 20060637

(51) Int. Cl.
 *G06F 15/167*    (2006.01)
(52) U.S. Cl.
 USPC ........... 709/216; 709/212; 709/214; 709/219; 455/557
(58) Field of Classification Search
 USPC .......................... 709/212–219, 228; 455/557
 See application file for complete search history.

(56) References Cited

U.S. PATENT DOCUMENTS

| | | | |
|---|---|---|---|
| 2002/0083160 A1 | 6/2002 | Middleton | |
| 2002/0091843 A1* | 7/2002 | Vaid .............................. | 709/230 |
| 2004/0204075 A1 | 10/2004 | Rusnak et al. | |
| 2005/0070329 A1* | 3/2005 | Lection et al. ................ | 455/557 |
| 2005/0144353 A1* | 6/2005 | Long et al. .................... | 711/100 |
| 2005/0289218 A1* | 12/2005 | Rothman et al. .............. | 709/203 |
| 2006/0130124 A1* | 6/2006 | Richardson et al. ............. | 726/3 |
| 2007/0104112 A1* | 5/2007 | Sayers et al. .................. | 370/252 |
| 2007/0156850 A1* | 7/2007 | Corrion ......................... | 709/219 |
| 2007/0294457 A1* | 12/2007 | Gantman et al. .............. | 710/313 |

FOREIGN PATENT DOCUMENTS

| | | |
|---|---|---|
| EP | 1 104 976 A1 | 6/2001 |
| EP | 1 385 317 A1 | 1/2004 |
| EP | 1 655 912 A1 | 5/2006 |

OTHER PUBLICATIONS

"*How to Map a Network Drive in Windows XP Using Windows Explorer*" Free Newsletter [online]. Bradley Mitchell, Jun. 18, 2006 [retrieved onOct. 10, 2007]. Retrieved from the Internet: <URL: http://web.arch ive.org/web/20060618024218/http://compnetworking. about.co/od/windowsxpnetworking/ht/mapnetworkdrive. htm>.
Buslink USB Wireless GPRS/WLAN Adapter. Product details and advertisement [online]. BUSIink, 2006; geekBlue Apr. 27, 2005 [retrieved on Oct. 10, 2007]. Retrieved from the internet: <URL: http://www.geekbIue.net/archives/2005/04/busiink_usb_wir. html> and <URL: http://www.buslink.com/B1/ProductDetails. asp?id138>.
International search report PCT/FI2007/050394 filed Jun. 27, 2007.

* cited by examiner

*Primary Examiner* — Ian N Moore
*Assistant Examiner* — Jackie Zuniga
(74) *Attorney, Agent, or Firm* — Harrington & Smith

(57) ABSTRACT

The invention relates to a method and portable electronic device for accessing a remote computer. The portable electronic device, e.g. a specially configured Universal Serial Bus (USB) device comprises an interface configured to connect the portable memory device with a local electronic device. The portable electronic device further comprises a memory configured to store the needed software and settings for establishing a remote connection from the portable memory device to a remote computer when connected to the local electronic device, the software and settings enabling the remote computer to appear as a local memory storage to the local electronic device.

16 Claims, 4 Drawing Sheets

NETWORK ACCESS WITH A PORTABLE MEMORY DEVICE

BACKGROUND OF THE INVENTION

1. Field of the Invention

The invention relates to data communications. In particular, the invention relates to a novel and improved method and portable electronic device for accessing a remote computer.

2. Description of the Related Art

Data content is typically accessed locally while using computers, e.g. personal computer or company server. However, it is also possible to access content in a computer or network server remotely. In general terms, remote access is the ability to get access to a computer or a network from a remote distance. In corporations, people at branch offices, telecommuters, and people who are traveling may need access to the corporation's network.

A remote access server is the computer and associated software that is set up to handle users seeking access to network remotely. The remote access server usually includes or is associated with a firewall server to ensure security. It may also comprise a router that can forward the remote access request to another part of the corporate network. A remote access server may also be used as part of a Virtual Private Network (VPN).

In order for a remote access connection to take place, the local machine must have a remote client software installed and the remote machine must have a remote server software installed. Also, at least a username and password is almost always required to authenticate the connecting user.

Remote access enables the ability to control the machine once the (remote) connection has been established. A remote access program can basically transform a local computer into a remote computer you connect to. This is advantageous for people who sometimes work e.g. from home and for server administrators who frequently need to update and make changes on their server machines. Most remote access programs also allow users to transfer files between the local and remote machines, which can save a lot of commuting time.

It is not any more uncommon that a user needs to remotely access some files located in a remote server. This is a major scenario in enterprises as disclosed above, but lately also valid in the home domain. People nowadays have an always-on broadband connection on their home networks and would like to access their personal files when out of home.

There exist many file transfer protocols, such as the File Transfer Protocol (FTP), Web-based Distributed Authoring and Versioning (WebDav) and Server Message Block (SMB) which all are Internet Protocol (IP) based protocols. Furthermore, solutions such as the Virtual Private Network (VPN) and IP Security (IPSec) are taken into use for securing the transfers in a way that traffic is encrypted end-to-end.

Let's assume that a user has a personal computer running at home (with routable IP address), and wants to remotely (for example from a friend's personal computer) access his home computer files. The user has to consider at the following three aspects:

Compatible client should be installed in a client computer. Depending on what file transfer protocol (e.g. WebDav, FTP, SMB) the server supports, the client computer should have a compatible client.

Setting up the connection in the client computer. Settings such as server's IP address, port, username and password need to be manually given in the client. Not so user friendly. Things are even more complicated if VPN is used, where policies need to be entered.

Security issues. When a username/password is manually entered using the keyboard, it is completely insecure. It is e.g. possible that someone is watching over the inserted data. Or when the client computer is not trusted, the owner of the client computer might have there a key logging application running. This is a typical security threat in all public computers (Internet Cafes etc.).

The first aspect (transfer protocol dependency) is mainly solved by modern operating systems that include most file transfer clients by default. For example, the Windows XP has FTP, WebDav and SMB clients by default. However, this is not the case with older systems. The server may also require some other special protocol (such as VPN).

For the second aspect (that is, the easiness of setup), there have been some solutions, e.g. having a link (for example: ftp://user:pass@myhomepc.com:500/path) on a private webpage or file. Following the link instructs the client to connect on a specific server/port with a well known protocol and access the given path. However, this is not the case with all transfer and security protocols. If the VPN is required (for connecting to the home server), VPN policy files are needed, containing security signatures etc. Those files are VPN client dependant, meaning that they will not work with clients of different vendors.

For the third aspect (security), there have been some solutions mainly in the corporate environment. For example, the SecureID solution, which requires a special device for generating a new password every from time to time. However, these solutions are very "heavy" and practically impossible for the home users. For non-trusted clients, there has not been any solution currently.

Until now there has not been a concrete and especially simple and efficient solution that handles all the three above aspects (transfer protocol dependency, easy client configuration and security).

SUMMARY OF THE INVENTION

A first aspect of the present invention is a portable memory device. The device comprises an interface configured to connect the portable memory device with a local electronic device. The device further comprises a memory configured to store the needed software and settings for establishing a remote connection from the portable memory device to a remote computer when connected to the local electronic device, the software and settings enabling the remote computer to appear as a local memory storage to the local electronic device.

Further in accordance with the first aspect in one embodiment, the portable memory device may comprise at least one of the following: a wireless data transceiver configured to establish the remote connection to the remote computer, a mechanical connector configured to be removably attachable with the local electronic device, a universal serial bus interface, a short range wireless transceiver, and software implementing at least one protocol layer for establishing the remote connection to the remote computer.

In one embodiment, the portable memory device is at least one of a memory stick, a mobile device, a personal digital assistant or a mobile computer.

A second aspect of the present invention is a method for establishing a connection to a remote computer. A portable memory device is connected with a local electronic device. The portable memory device comprises a memory configured to store the needed software and settings for establishing a remote connection from the portable memory device to a remote computer, the software and settings enabling the remote computer to appear as a local memory storage to the local electronic device. A remote connection is initiated starting from the portable memory device to the remote computer by using the software and settings stored on the portable memory device.

Further in accordance with the second aspect in one embodiment, the method may comprise at least one of the following: the settings comprise at least one of the following items: security keys, remote computer internet protocol address, remote computer port number, and username and password; initiating the remote connection comprises initiating the remote connection to the remote computer with a data connection interface of the local electronic device; initiating the remote connection comprises initiating the remote connection to the remote computer with a wireless data transceiver comprised in the portable memory device, initiating the remote connection comprises initiating the remote connection to the remote computer automatically, when the portable memory device is connected to the local electronic device; and initiating the remote connection comprises initiating the remote connection to the remote computer in response to user instructions.

A third aspect of the present invention is a system comprising a local electronic device, a remote computer, and a portable memory device. The portable memory device comprises an interface configured to connect the portable memory device with the local electronic device, and a memory configured to store the needed software and settings for establishing a remote connection from the portable memory device to the remote computer when connected to the local electronic device, the software and settings enabling the remote computer to appear as a local memory storage to the local electronic device.

A fourth aspect of the present invention is a portable memory device comprising means for connecting the portable memory device with a local electronic device; and means for storing the needed software and settings for establishing a remote connection from the portable memory device to a remote computer when connected to the local electronic device, the software and settings enabling the remote computer to appear as a local memory storage to the local electronic device.

The invention at hand allows an easy and secure access to content in a remote server (e.g. office computer, home computer etc.). Furthermore, since in one embodiment of the invention the portable electronic device, e.g. a USB device, includes also a wireless transceiver, the client computer itself does not have to have an Internet access.

The solution is also extremely easy to an end-user since there is no need for manual setting of parameters and setting on the client computer. Furthermore, for the user, the portable memory device appears to by a local memory storage.

The invention also improves user security since there is no risk for stealing user's username and password since the user may not have to enter them into the client computer. They are securely saved in the portable memory device. Once the device is disengaged from the client, there is nothing left (e.g. drivers, settings, configurations, usernames, passwords etc.) on the client computer.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

The following description discloses several different embodiments that implement the invention at hand.

Figure 1:
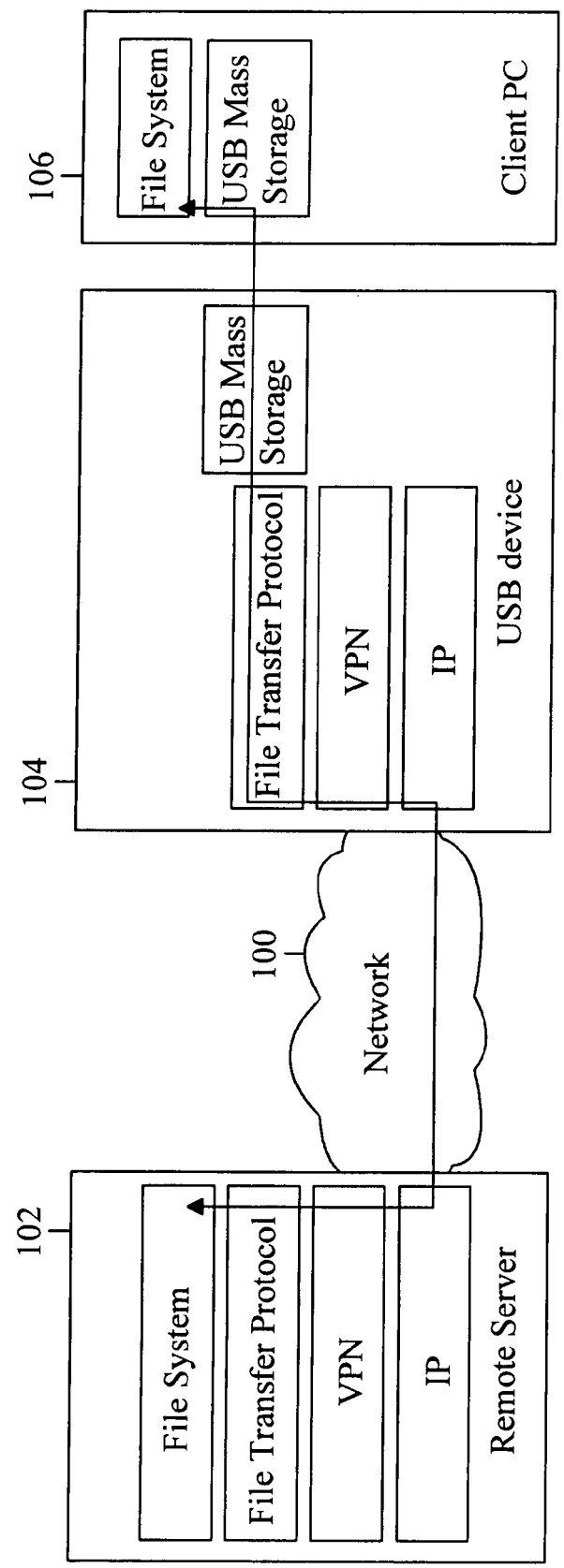
FIG. 1 is a diagram illustrating one embodiment of a system according to the present invention, FIG. 2 discloses another possible implementation of the solution disclosed in the invention, FIG. 3 discloses another possible implementation of the solution disclosed in the invention, FIG. 4 discloses another possible implementation of the solution disclosed in the invention, FIG. 5 discloses another possible implementation of the solution disclosed in the invention, FIG. 6 discloses another possible implementation of the solution disclosed in the invention, FIG. 7 discloses another possible implementation of the solution disclosed in the invention, and FIG. 8 discloses an embodiment of signaling between different elements according to the present invention.

The embodiment disclosed in FIG. 1 uses a special Universal Serial Bus (USB) device 104 that is "visible" on the client computer 106 as a flash disk. Therefore, the use of the USB device 104 does not require special driver installation in the client computer 106, since in practise most operating systems support USB mass storage devices by default.

The USB device 104 has been configured to include all the needed functionality (e.g. connectivity stack, file transfer protocol, VPN etc.) and settings (e.g. security keys, server IP address and port, username and password etc.) for establishing a connection to a remote server 102, e.g. to a home or office server. As disclosed in FIG. 1, the USB device 104 includes a protocol stack comprising the Internet Protocol, Virtual Private and File Transfer Protocol layers.

The USB device 104 exports all the needed remote files to the client computer 106 as if it would be a USB mass storage device. Due to this feature the user is allowed to do read/write operations without the need of any special software and settings in the client computer 106 itself. The security and connectivity starts from the USB device 104 instead of the client computer 106. Once the USB device 104 is detached from the client computer 106, the connection to the remote server 102 is terminated and no traces (settings etc.) are left back in the client computer 106.

Figure 2:
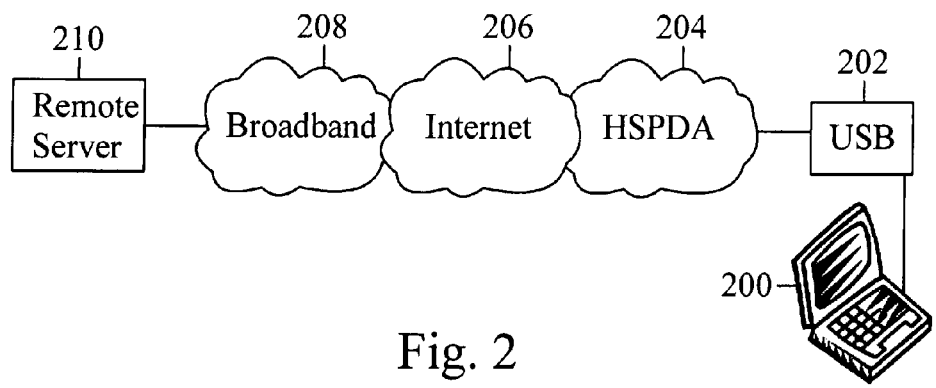

FIG. 2 discloses another possible implementation of the solution disclosed in the invention. In this embodiment, in addition to the USB device disclosed in FIG. 1, the USB device 202 includes also a wireless interface. The wireless interface is e.g. the High Speed Downlink Packet Access (HSPDA), a Wireless Local Area Network (WLAN) or any other suitable wireless data connectivity interface. When the USB device 202 is equipped with the wireless interface, it can be plugged in any client computer 200 that may not have any kind of Internet access itself. As already disclosed in the description of FIG. 1, the USB device 202 has all the needed connectivity configurations (e.g. VPN settings, IP/port of server, username, password, etc.) stored therein. Once the USB device 202 is connected on client computer 200 it can be used to connect to the cellular network 204 and establishes a connection to the Internet 206 and further to a remote server 210 via broadband access 208. In one embodiment the USB device 202 connects to the cellular network 204 automatically when the USB device 202 is attached to the client computer 200.

The USB device 202 may also create a VPN tunnel to the remote server 210, and a remote file system protocol is used for obtaining the server's file listings. The file listings are automatically exported to the client computer 200 as if they were stored on the USB device 202 itself. Furthermore, the user is able to read and write files as if they were local. In the embodiment disclosed in FIG. 2, the client computer 200 sees the USB device 202 as a normal USB mass storage device and not as a cellular modem or any other kind of special device.

In one embodiment of FIG. 2, the solution disclosed in the invention may also be used for other applications apart from file access. For example, remote desktop control of a home or office computer can be a very useful application. Again, the USB device may have a simple file that needs no installation (it may e.g. be a java file to enable cross platform functionality), and upon execution it would connect to the home or office computer and act as a remote desktop control client.

Figure 3:
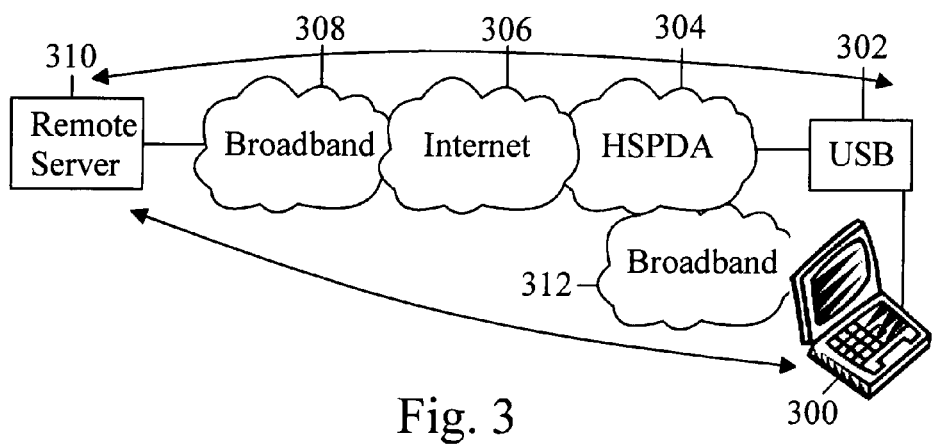

FIG. 3 discloses another possible implementation of the solution disclosed in the invention. In this embodiment broadband access 312 is the primary channel for making the actual file transfers between a client computer 300 and a remote server 310. A USB device 302 may also have a wireless interface to a cellular network 304 to be used as a signalling channel. In another embodiment, the USB device 302 does not have the wireless interface at all but uses the broadband access 312 of the client computer 300 to connect to the remote server 310 via the Internet 306 and remote server's 310 broadband access 308.

The solution disclosed in FIG. 3 makes use of the client computer's 300 connectivity to the Internet 306, still without using any special drivers for the USB device 302. In one embodiment of FIG. 3, there may be stored on the USB device 302 a special application that only needs to be executed but does not require installation on the client computer 300. This application will be executed (manually or automatically) once the USB device 302 is connected on the client computer 300 and it may act as a "bridge" between the USB interface and the connectivity stack of the client computer 300. The basic functionality and content of the USB device 302 is the same as in the embodiment in FIG. 2.

Figure 4:
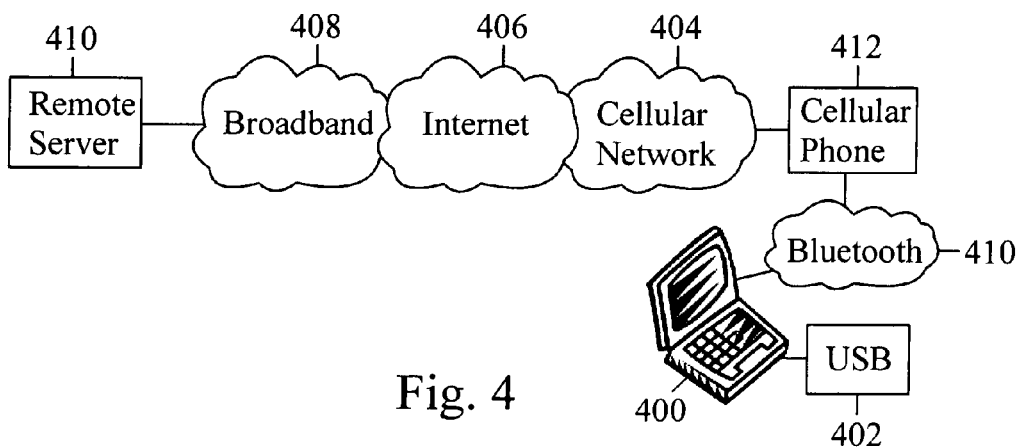

FIG. 4 discloses another possible implementation of the solution disclosed in the invention. In this embodiment, the USB device 402 does not necessarily include a wireless interface towards a cellular network. Instead, an access to the Internet 406 from a client computer 400 has been implemented by using a local wireless connection, e.g. Bluetooth 410, between the client computer 400 and a cellular phone 412. In this embodiment, the cellular phone 412 acts as a modem. However, the security associations already discussed in earlier embodiments are established from the USB device 402. A remote server 410 is connected to the Internet 406 by a broadband access 408.

Figure 5:
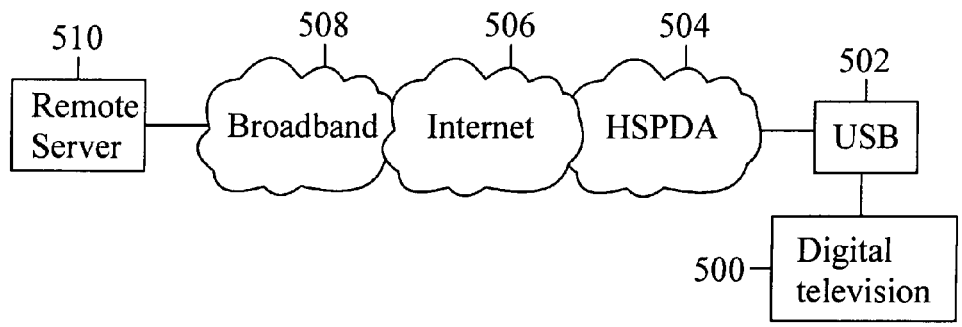

FIG. 5 discloses another possible implementation of the solution disclosed in the invention. The solution disclosed in the invention works also with devices other than computers that support a USB mass storage device. In FIG. 5, a television 500 is used for viewing images stored remotely in a remote server 510. It should be noted that the television is only an example of non-computer devices. Other devices supporting USB mass storage device may be e.g. cars, mobile phones, audio systems, digital cameras etc. As to establishing a connection between a USB device 502 and the remote server 510, the elements between them (504, 506, 508) are the same as in FIG. 2 (as elements 204, 206, 208).

Figure 6:
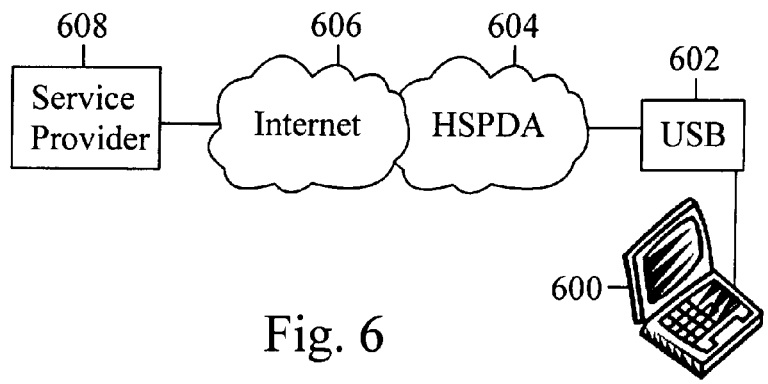

FIG. 6 discloses another possible implementation of the solution disclosed in the invention. The elements 500, 502, 504 and 506 are the same as elements 200, 202, 204 and 206 in FIG. 2. The difference between FIGS. 2 and 6 is that in the embodiment of FIG. 6 the USB device 502 connects to a service provider 508. In other words, the USB device 502 may be used for accessing $3^{rd}$ party services (e.g. Flickr or other document or image sharing services) that provide remote storage space. It can also support many remote servers at the same time. For example, top level folders in the USB device 502 may correspond to different services. For example, the folder "MyFlickr" in the root of the USB device 502 would connect to the Flickr service, while the folder "MyHome" would automatically connect to a home server.

Naturally, the USB device may also have some local flash memory that can be used as a normal "static" USB flash disk. And since it may have a cellular interface, it may be used as a cellular modem (with the provided drivers), if required by the user.

Figure 7:
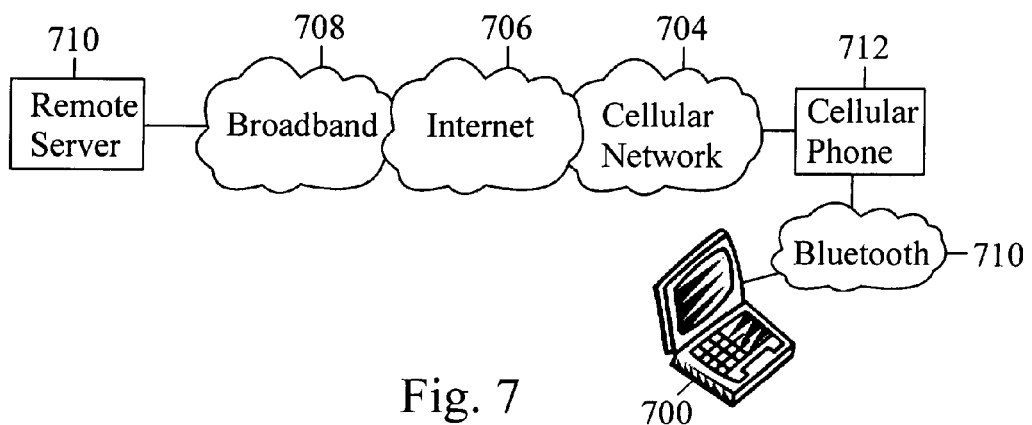

FIG. 7 discloses another possible implementation of the solution disclosed in the invention. The elements 700, 704, 706, 708, 708 and 712 are the same as elements 400, 404, 406, 408, 410 and 412 in FIG. 4. In this embodiment, however, the cellular phone 712 itself acts as a portable memory disclosed in the invention. Therefore, the client computer 700 sees the cellular phone 712 partly as a common mass memory storage and partly as a cellular phone having communication capabilities towards the cellular network 704.

Figure 8:
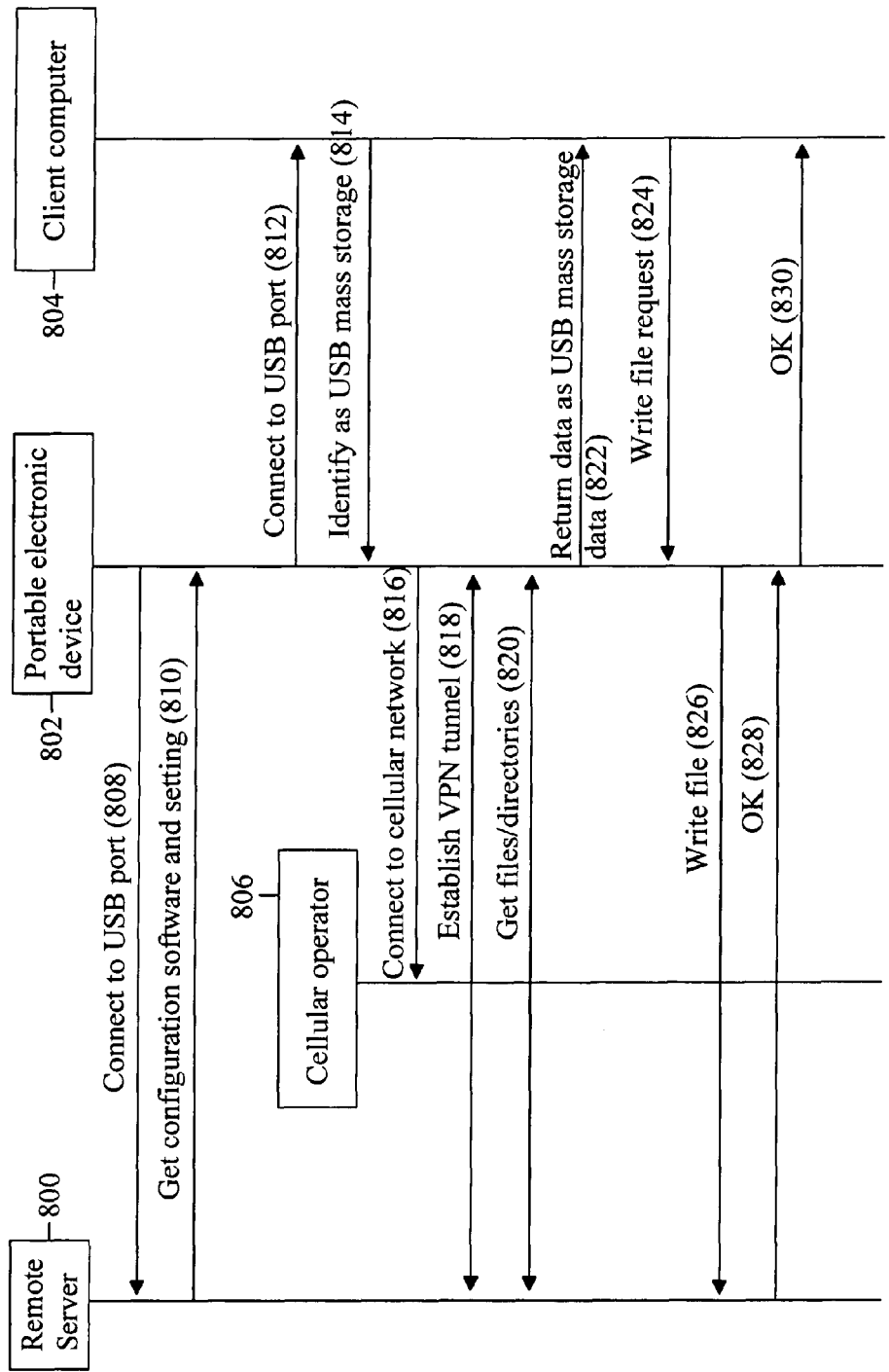

FIG. 8 discloses a signaling diagram corresponding to the solution disclosed in FIG. 2. The elements disclosed in FIG. 8 are a remote server 800, a portable electronic device 802, a client computer 804 and a cellular operator 806.

Steps 808 and 810 relate to configuring the portable electronic device 802, e.g. a USB device. It is evident that the portable electronic device may be implemented as any appropriate device that implements the solution disclosed in the invention. Steps 808 and 810 disclose only one example how the USB device 802 may be configured. At step 808, the user plugs the USB device on his server, and at step 810 with a special application running on the server, all the needed software, parameters and settings (e.g. IP address, security keys, username, password etc.) are stored automatically on the USB device. Then the USB device 802 is ready to be used in any client computer.

At step 812 the USB device 802 is connected to a USB port of the client computer 804. The client computer may be a portable device, a laptop computer or a conventional desktop computer. The client computer identifies the USB device as a USB mass storage, step 814.

At step 816 the USB connects to a cellular network either automatically in response to connecting the USB device to the client computer 804 or by a manual initiation by the user of the client computer 804. As in the embodiment of FIG. 2, the USB device 802 includes also a wireless interface. The wireless interface is e.g. the High Speed Downlink Packet Access (HSPDA), a Wireless Local Area Network (WLAN) or any other suitable wireless data connectivity interface.

Furthermore, as disclosed in the description of FIG. 1, the USB device 802 has all the needed connectivity configurations (e.g. VPN settings, IP/port of server, username, password, etc.) stored therein. The USB device 802 establishes a connection to a remote server 800. In this embodiment, at step 818 the USB device 802 may creates a VPN tunnel to the remote server 210, and a remote file system protocol is used for obtaining the server's file listings, step 820. The file listings are automatically exported to the client computer 804 as if they were stored on the USB device 802. Thus, the user is able to read and write files as if they were local. The user wants to store a file from the client computer 804 to the remote server 800. Therefore, at step 824 the client computer 804 sends a write file request to the USB device 802, and the USB device 802 performs the storing of the file on the remote server, step 826. If the storing was successful, the remote server 828 returns an OK message to the USB device 802, step 828. And at step 830 the OK message is finally forwarded to the client computer 804.

The invention has been illustrated by using a USB device as an example of a portable memory device. It is evident to a person skilled in the art that the interface between the portable memory device and the client computer need not necessarily be a USB interface. The interface may also be e.g. a wireless interface or any other wired or mechanical interface, e.g. to Firewire. Mechanical interface refers e.g. to an interface in which a first part of the interface is configured to be removably attachable to a second part of the interface. Therefore, for example, a mobile device or mobile phone can be used instead of a USB memory stick implementation. However, the basic functionality relating to the invention remains the same regardless of the form of the portable electronic device.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A portable memory device comprising:
    an interface connecting the portable memory device with a local electronic device;
    a memory storing software and settings for establishing a remote connection from the portable memory device to a remote computer when connected to the local electronic device, the software and settings executing at least one application stored on the portable memory device, the at least one application creating a bridge between the portable memory device and a connectivity stack of the local electronic device;
    where the at least one application comprises a file executed to connect to the remote computer and act as a remote control client for the remote computer on the local electronic device; and
    the software and settings and a wireless data transceiver establishing, automatically in response to connecting the portable memory device with the local electronic device, a wireless connection from the portable memory device to a cellular network, establishing an internet connection via the cellular network, and then establishing a virtual private network tunnel between the portable memory device and the remote computer, wherein the virtual private network tunnel is established through the wireless connection from the portable memory device to the cellular network and the internet connection via the cellular network, wherein the software and settings automatically export file listings of the remote computer to the local electronic device causing the remote computer to appear as a local memory storage to the local electronic device.

2. The portable memory device according to claim 1, wherein the wireless data transceiver comprises a short range wireless transceiver.

3. The portable memory device according to claim 1, where the at least one application comprises a java file executed to connect to the remote computer and act as a remote control client for the remote computer on the local electronic device.

4. The portable memory device according to claim 1, wherein the interface comprises a mechanical connector configured to be removably attachable with the local electronic device.

5. The portable memory device according to claim 4, wherein the interface comprises a universal serial bus interface.

6. The portable memory device according to claim 1, wherein the file listings of the remote computer exported to the local electronic device enable a user of the local electronic device to read and write files of the remote computer via the portable memory device.

7. The portable memory device according to claim 1, wherein the software and settings implement at least one protocol layer for establishing the remote connection to the remote computer over the virtual private network tunnel.

8. The portable memory device according to claim 1, wherein the portable memory device is a memory stick.

9. The portable memory device according to claim 1, wherein the portable memory device is a mobile device, a personal digital assistant or a mobile computer.

10. The portable memory device according to claim 1, wherein the settings comprise at least one of security keys, remote computer internet protocol address, remote computer port number, and username and password.

11. A method comprising:
    connecting a portable memory device with a local electronic device, the portable memory device comprising a memory configured to store needed software and settings for establishing a remote connection from the portable memory device to a remote computer;
    executing, with the portable memory device, at least one application stored on the portable memory device, the application creating a bridge between the portable memory device and a connectivity stack of the local electronic device;
    where the at least one application comprises a file executed to connect to the remote computer and act as a remote control client for the remote computer on the local electronic device; and
    initiating, with the portable memory device, establishment of a remote connection starting from the portable memory device to the remote computer by using the software and settings stored on the portable memory device, where establishing the remote connection comprises causing the portable memory device to wirelessly connect, automatically in response to connecting the portable memory device with the local electronic device, to a cellular network in order to establish an internet connection via the cellular network and then establishing a virtual private network tunnel between the portable memory device and the remote computer, wherein the virtual private network tunnel is established through the wireless connection from the portable memory device to the cellular network and the internet connection via the cellular network, wherein the portable memory device automatically exports file listing of the remote computer to the local electronic device causing the remote computer to appear as a local memory storage to the local electronic device.

12. The method according to claim 11, wherein the settings comprise at least one of security keys, remote computer internet protocol address, remote computer port number, and username and password.

13. The method according to claim 11, wherein initiating the remote connection comprises one of:

initiating the remote connection to the remote computer with a wireless data transceiver included in the portable memory device.

14. The method according to claim 11, where the at least one application comprises a java file executed to connect to the remote computer and act as a remote control client for the remote computer on the local electronic device.

15. The method according to claim 11, wherein initiating the remote connection comprises: initiating the remote connection to the remote computer in response to user instructions.

16. The method according to claim 11, where the file listings of the remote computer exported to the local electronic device enable a user of the local electronic device to read and write files of the remote computer via the portable memory device.

\* \* \* \* \*